US007620260B2

(12) United States Patent
Lertrattanapanich et al.

(10) Patent No.: US 7,620,260 B2
(45) Date of Patent: Nov. 17, 2009

(54) LINE THINNING METHOD AND SYSTEM FOR GRAYSCALE IMAGE

(75) Inventors: Surapong Lertrattanapanich, Irvine, CA (US); Yeong-Taeg Kim, Irvine, CA (US)

(73) Assignee: Samsung Electronics Co., Ltd., Suwon (KR)

(*) Notice: Subject to any disclaimer, the term of this patent is extended or adjusted under 35 U.S.C. 154(b) by 573 days.

(21) Appl. No.: 11/272,196

(22) Filed: Nov. 10, 2005

(65) Prior Publication Data

US 2007/0104386 A1   May 10, 2007

(51) Int. Cl.
G06K 9/42 (2006.01)
G06K 9/44 (2006.01)
G06K 9/38 (2006.01)

(52) U.S. Cl. .................... 382/258; 382/270
(58) Field of Classification Search .............. None
See application file for complete search history.

(56) References Cited

U.S. PATENT DOCUMENTS

| | | | | | |
|---|---|---|---|---|---|
| 3,879,707 | A | * | 4/1975 | Rohrer | 382/183 |
| 4,849,679 | A | * | 7/1989 | Taft et al. | 318/577 |
| 4,972,495 | A | * | 11/1990 | Blike et al. | 382/304 |
| 5,335,298 | A | * | 8/1994 | Hevenor et al. | 382/199 |
| 5,583,659 | A | * | 12/1996 | Lee et al. | 358/3.13 |
| 5,790,269 | A | * | 8/1998 | Masaki et al. | 358/447 |
| 5,825,924 | A | * | 10/1998 | Kobayashi | 382/219 |
| 7,194,142 | B2 | * | 3/2007 | Maurer | 382/258 |
| 2005/0018893 | A1 | * | 1/2005 | Wang et al. | 382/132 |
| 2005/0094890 | A1 | * | 5/2005 | Wang | 382/266 |

OTHER PUBLICATIONS

L. Lam, S.W. Lee, and C. Y. Suen, *Thinning Methodologies—A Comprehensive Survey*, IEEE Transactions on Pattern Analysis and Machine Intelligence, Sep. 1992, pp. 869-885, vol. 14, No. 9.
S. Rami-Shojaei and C. Vachier, *H-Thinning for Gray-Scale Images*, International Conference on Image Processing 2004, pp. 287-290.
M. E. Hoffman and E. K. Wong, *Scale-Space Approach to Image Thinning Using the Most Prominent Ridge-Line in the Image Pyramid Data Structure*, Proc. SPIE—Document Recognition, Apr. 1998, pp. 242-252, vol. 14, No. 9.
J. Marchadier, D Arques, and S. Michelin, *Thinning Grayscale Well-Composed Images*, Pattern Recognition Letters, 2004, pp. 581-590, vol. 25.

\* cited by examiner

*Primary Examiner*—Yubin Hung
*Assistant Examiner*—Michelle Entezari
(74) *Attorney, Agent, or Firm*—Kenneth L. Sherman, Esq.; Michael Zarrabian, Esq.; Myers Andras Sherman LLP

(57) ABSTRACT

A line thinning algorithm (LTA) for a grayscale input image, wherein the LTA is a separable algorithm that performs on each row of input grayscale image sequentially from top to bottom and subsequently on each column from left to right, independently. The LTA is very robust to the noise and is capable of thinning lines even in noisy image areas. The level of thinning is fully adaptive to the transition range and dynamic range locally in each line segment. Furthermore, the LTA for a black line can be easily generalized for a white line counterpart by simply switching the sign of one parameter DELTA from positive to negative without changing other aspects of the LTA.

35 Claims, 5 Drawing Sheets

|  | | s[x] | | |
|---|---|---|---|---|
|  | | MINUS | ZERO | PLUS |
| s[x-1] | MINUS | X | V | V |
| | ZERO | P | X | V |
| | PLUS | P | P | X |

LINE THINNING METHOD AND SYSTEM FOR GRAYSCALE IMAGE

FIELD OF THE INVENTION

The present invention relates to the field of digital image processing, and more particularly to a method of line thinning for digital grayscale images.

BACKGROUND OF THE INVENTION

In digital images, "Thinning" is usually considered as one of the morphological operators which requires the input image to be binary instead of grayscale. In addition, Thinning is a sequential operator, requiring multiple operations corresponding to a sequence of structuring elements with different orientations. A comprehensive survey about thinning methodologies can be found in Louisa Lam, Seong-Whan Lee, and Ching Y. Suen, "Thinning Methodologies—A Comprehensive Survey," IEEE Transaction on Pattern Analysis and Machine Intelligence, Vol. 14, No. 9, September 1992, pp. 869-885. Other thinning methods with some variations where the input is grayscale image instead of binary image could be found in: Sabrina Rami-Shojaei and Corinne Vachier, "H-Thinning for Gray-Scale Images," International Conference on Image Processing 2004, pp. 287-290; Mark E. Hoffman and Edward K. Wong, "Scale-Space to Image Thinning Using the Most Prominent Ridge-Line in the Pyramid Data Structure," Proc. SPIE—Document Recognition V, Vol. 3305, April 1998, pp. 242-252; and Jocelyn Marchadier, Dider Arques, and Sylvain Michelin, "Thinning Grayscale Well-Composed Images," Pattern Recognition Letters, Vol. 25, 2004, pp. 581-590.

However, in the morphological sense, the thinning method where input could be either binary or grayscale image generates a minimally connected line that is equidistant from the boundaries and results in the skeleton of each object or line in the input image. In certain applications, the resulting skeleton is a useful topological representation of an object; however, it is not the case for the image enhancement application since the geometric shape of thinned lines/objects are not preserved.

BRIEF SUMMARY OF THE INVENTION

In one embodiment the present invention provides a line thinning method which is not based on the morphology and does not aim to produce the skeleton of each line or object in the image. Rather, the line thinning method aims to adjust the rising and falling segments of the objects/lines in such a way that the objects/lines look thinner and simultaneously their geometric shapes are preserved. A line thinning method according to the present invention is very robust to noise while the conventional line thinning methods usually do not take into account the noise level of an input image.

As such, in one embodiment the present invention provides a line thinning algorithm (LTA) method and system for processing grayscale digital images. The LTA method is applied to an input image which is in grayscale format, wherein the LTA method requires only two separable operations along horizontal and vertical directions. The LTA method is a separable algorithm which performs on each row of input grayscale image sequentially from top to bottom and subsequently on each column from left to right, independently. The LTA method is very robust to the noise, and is capable of thinning the lines even though they are in noisy image areas. The level of thinning is fully adaptive to the transition range and dynamic range locally in each line segment in the image. Furthermore, the LTA method for a black line can be easily generalized for a white line counterpart by simply switching the sign of one parameter from positive to negative without changing other parts of LTA.

As such, in one implementation, a LTA method for a grayscale digital image comprising pixels, including the steps of: (a) for a pixel in a sequence of pixels in the input image, locating a segment of the sequence including the pixel and neighboring pixels; (b) determining the local characteristics of the segment based on the characteristics of the pixels therein; and (c) performing a thinning operation on the pixel based on the local characteristics of the segment. Said local characteristics include dynamic range and transition range of the segment based on the characteristics of the pixels in the segment.

In one example, the sequence of pixels represents a line in grayscale, wherein said local characteristics provide a measure of the visibility of the line in the image compared to image background. The local characteristics can include a dynamic range and transition range of the segment, providing a measure of the visibility of portion of the line in the image segment compared to image background. The dynamic range indicates how obvious the line is in the image. The transition range indicates how wide the line is.

The step of performing thinning further includes the steps of performing a thinning operation on the pixel based on the dynamic range and transition range of the segment. The step of determining the dynamic range further includes the steps of determining the difference between pixel grayscale level at ends of the segment. The step of determining the transition range further includes the steps of determining the number of pixels in the segment. In one example, the sequence of pixels comprises a row of pixels in the image. In another example, the sequence of pixels comprises a column of pixels in the image. The steps (a) through (c) are performed for each row of pixels in the image, and independently performing steps (a) through (c) for each column of pixels in the image.

The step of performing thinning further includes the steps of performing a thinning operation on the pixel based on the dynamic range and transition range of the segment. The step of locating a segment further includes the steps of locating each falling segment in the sequence that is characterized by pixels having a decreasing dynamic range, and locating each rising segment in the sequence that is characterized by pixels having an increasing dynamic range, one end of each segment being at a dynamic range maximum (PEAK) pixel in the sequence and the other end of the segment being at a dynamic range minimum (VALLEY) pixel in the sequence. The steps of performing thinning further includes the steps of determining a dynamic range coefficient $\beta$ for each segment, determining a transition range coefficient $\alpha$ for each segment, and adjusting each input pixel in a segment to generate an output pixel based on the dynamic range coefficient $\beta$ and the transition range coefficient $\alpha$ of the segment.

These and other features, aspects and advantages of the present invention will become understood with reference to the following description, appended claims and accompanying figures.

BRIEF DESCRIPTION OF THE DRAWINGS

FIG. 4 shows an example of the classification table used in the P-V Classifier of FIG. 3.

DETAILED DESCRIPTION OF THE INVENTION

In one embodiment the present invention provides a line thinning algorithm (LTA) method and system for processing grayscale digital images. The LTA method is applied to an input image which is in grayscale format, wherein the LTA method requires only two separable operations along horizontal and vertical directions. The LTA method is a separable algorithm which performs on each row of input grayscale image sequentially from top to bottom and subsequently on each column from left to right, independently. The LTA method is very robust to the noise, and is capable of thinning the lines even though they are in noisy image areas. The level of thinning is fully adaptive to the transition range and dynamic range locally in each line segment in the image. Furthermore, the LTA method for a black line can be easily generalized for a white line counterpart by simply switching the sign of one parameter (DELTA) from positive to negative without changing other parts of LTA. In the present invention, line thinning method preserves the geometric shape of lines/objects. Moreover, it can perform thinning of lines even in noisy image regions and it can be adaptive to how obvious the line (foreground) is compared to the background, and how wide the line itself is.

In the description herein, a novel representation of the line in the image is first introduced. Without loss of generality, let the color of considered line of the input grayscale image be black (low grayscale value) and the background color be white (high grayscale value). The LTA method is a separable algorithm in that it performs on each row of input image sequentially from top to bottom and then on each column from left to right. Therefore, the thinning problem can be narrowed down into a one-dimensional problem. For simplicity and without loss of generality, the input to the LTA method described herein is assumed to be each one-dimensional row of an input two-dimensional image.

When considering a current row of pixels in the input image, the portion of the row containing a black line in the image can be partitioned into two segments, namely a falling segment and a rising segment.

Figure 1:
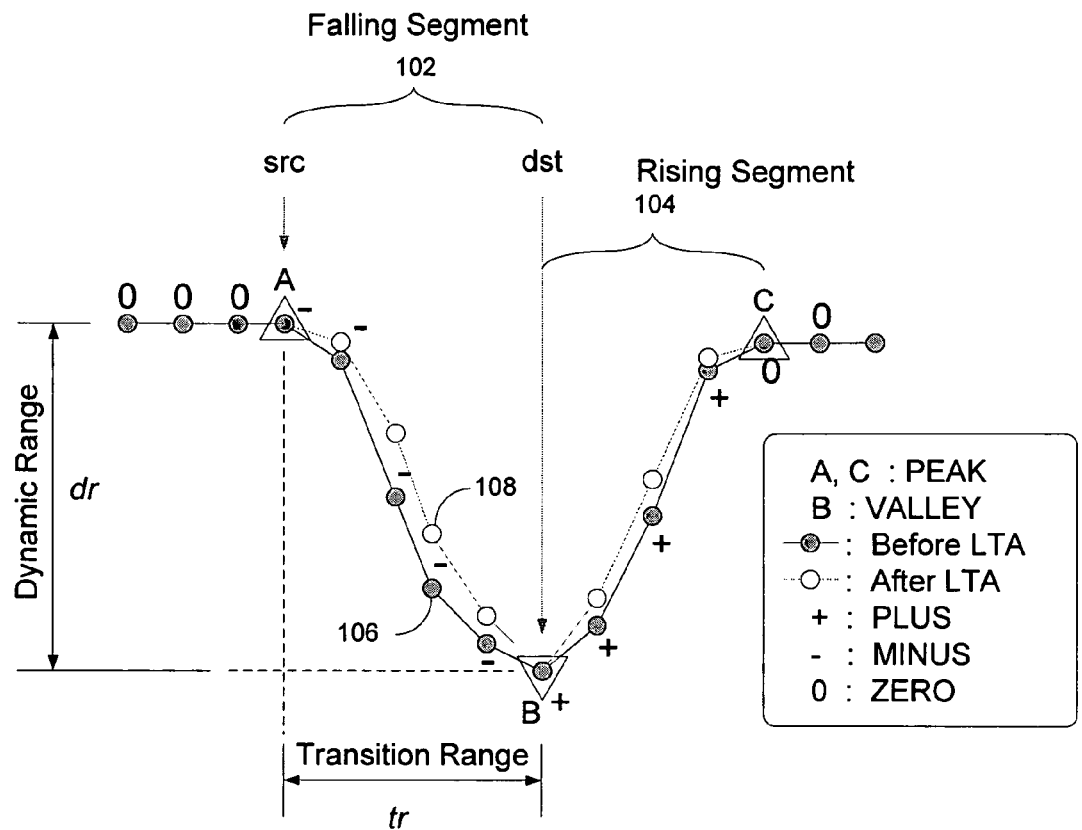
FIG. 1 shows a diagrammatical, conceptual visualization of the application of a black Line Thinning Algorithm (LTA) method, according to an embodiment of the present invention.

The example 100 in FIG. 1 shows the dynamic range in luminance of pixels in a portion of the current row of the input image representing a black line, specified by a falling segment 102 followed by a rising segment 104. The falling and rising segments 102 and 104, respectively, contain all pixels starting from pixel A to pixel B, and pixel B to pixel C. The pixels A, B, and C are classified to PEAK, VALLEY, and PEAK features, respectively (explained further below).

Conceptually, in order to make black line thinner, the original pixel values denoted by filled shaded circles 106 within both falling and rising segments 102, 104, respectively, must be lifted to obtain corresponding resulting pixel values denoted by hollow circles 108. The term "lifted" herein means properly adjusted so that all filled shaded pixels 106 are the same as those with hollow circles 108. The pixels in between A and B in falling segment and pixels in between B and C in rising segment are "lifted". It is noted that the pixels A and B at both ends of falling segment and pixels B and C at both ends of rising segment remain unchanged. Only the pixels in between each segment excluding end pixels (A, B, C) are adjusted (lifted).

Since the input image is in grayscale (not binary), many issues must be taken into consideration. First, the LTA method should provide thinning of lines even in noisy image regions. Second, the LTA method should be adaptive to how obvious (i.e., black) the line (foreground) is when compared to the background, and how wide the line itself is. According to the example LTA method described herein, two metrics, dynamic range dr and transition range tr, are introduced in order to indicate how obvious and wide a line is, respectively.

The example in FIG. 1 shows a diagrammatical and conceptual visualization of the application of a Black LTA method to the portion of a current row of the input image containing a black line, according to an embodiment of the present invention. The falling 102 segment of the black line contains all pixels starting from PEAK A to VALLEY B (further definitions of PEAK and VALLEY are provided in relation to FIG. 3 below). Likewise, the rising segment 104 of the black line contains all pixels starting from VALLEY B to PEAK C. The symbols 0, +, and − (ZERO, PLUS, and MINUS) in FIG. 1 are an associated class with each pixel in the current row of the input image. Further, the ends of the falling segment 102 are marked by indices src and dst, with the pixels in between defining a transition range tr for the falling segment 102. The transition range tr for each segment (e.g., segments 102 and 104) indicates how wide the line is, wherein the transition range tr is defined by the number of pixels in that segment. As such, the transition range tr of a segment can be represented by relation (1) below:

$$tr = dst - src + 1. \quad (1)$$

Further, as shown in FIG. 1, the dynamic range dr of each segment (e.g., segments 102 and 104) indicates how obvious the line is. The dynamic range dr of each segment is defined by the difference between grayscale level at ends of the segment. As such, the dynamic range dr of a segment can be represented by relation (2) below:

$$dr = |f[src] - f[dst]|, \quad (2)$$

where f[x] is the grayscale value of the considered row of input image at index x. In FIG. 1, each pixel 108 (in both falling and rising segments 102 and 104, respectively), results from application of the LTA method to the corresponding original pixel 106.

Figure 2:
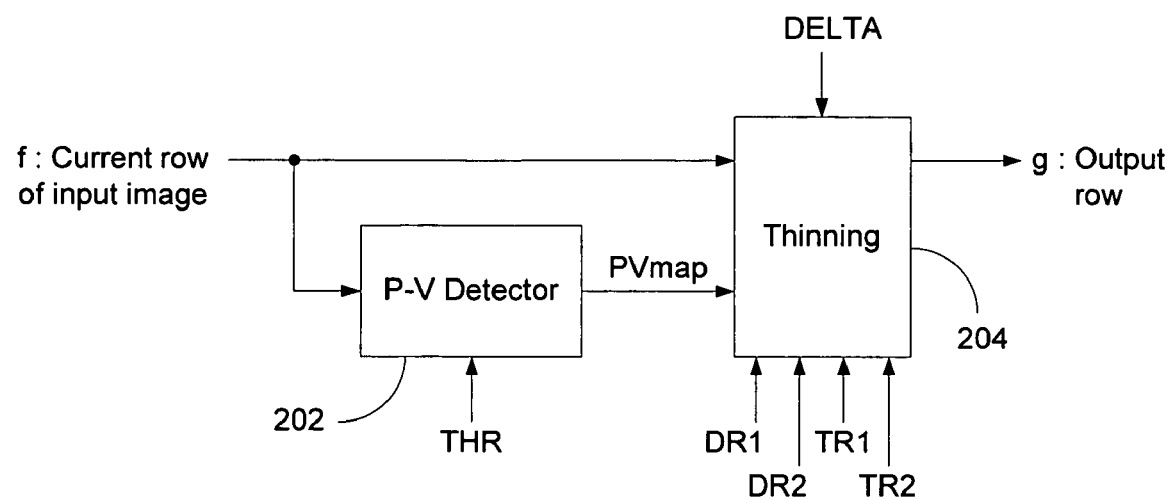
FIG. 2 shows a functional block diagram of an embodiment of an LTA system according to an embodiment of the present invention.

FIG. 2 shows a functional block diagram of an embodiment of a thinning system 200 implementing the above LTA method, according to an embodiment of the present invention. The system 200 includes two main components: a P-V Detector 202 and a Thinning module 204. For each row of the input image, the considered row f is input to the P-V Detector 202 which generates an output map PVmap including an element containing the class associated with each pixel in the row. The element in PVmap comprises one of the classes {PEAK, VALLEY, NEITHER}. An input parameter THR used in the P-V Detector 202 to lower misdetection probability of PEAK and VALLEY in noisy images. The typical value of THR is 5% of the highest grayscale value (e.g., THR=13 for 8-bit grayscale image), however, if the prior knowledge of noise level of input image is available, THR can be set to be proportional to the noise level.

The resulting PVmap and the considered row f of the input image are input to the Thinning module 204 which adjusts each pixel value within a considered segment in the row f (e.g., segments 102, 104 in FIG. 1). Five additional input parameters DR1, DR2, TR1, TR2, and DELTA in the Thinning module 204 are used to control the level of thinning based on the dynamic range and transition range of each segment in the row f, to generate the output row g.

Figure 3:
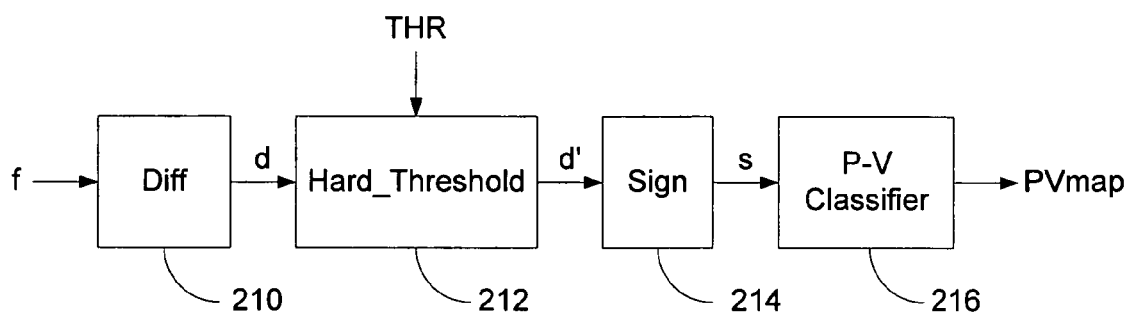
FIG. 3 shows a functional block diagram of an embodiment of the P-V Detector module in the system of FIG. 2.

FIG. 3 shows a functional block diagram of an implementation of the P-V Detector 202 of FIG. 2, according to an embodiment of the present invention. P-V Detector 202 comprises a Differentiating module 210, a Hard_Threshold module 212, a Sign module 214 and a P-V Classifier module 216. An example operation of the P-V Detector 202 is now described.

Suppose that the current row f of input image contains a set of N pixels {f[0], f[1], . . . , f[N−1]}. First, the estimated derivatives d at each pixel are calculated by the Differentiating module 210 according to relation (3) below:

$$d[x]=f[x+1]-f[x], \text{ for } 0 \leq x \leq N-1. \tag{3}$$

Note that replicate boundary value f[N]=f[N−1] is utilized in this example.

Next, the refined derivative d' is calculated by Hard_Threshold module 212 according to relation (4) below:

$$d'[x] = \begin{cases} d[x] & \text{if } |d[x]| > THR; \\ 0 & \text{otherwise.} \end{cases} \text{ for } 0 \leq x \leq N-1. \tag{4}$$

Then, the Sign module 214 calculates the resulting sign s associated with each pixel, wherein the sign operator implemented by the Sign module 214 is according to relation (5) below:

$$s[x] = \begin{cases} \text{MINUS} & \text{if } s[x] < 0; \\ \text{ZERO} & \text{if } s[x] = 0; \\ \text{PLUS} & \text{otherwise.} \end{cases} \text{ for } 0 \leq x \leq N-1. \tag{5}$$

Then, the P-V Classifier module 216 is applied to the calculated sign s to generate the above-mentioned PVmap according relation (6) below:

$$PVmap[x]=PVClassifier(s[x-1],s[x]), \text{ for } 0 \leq x \leq N-1, \tag{6}$$

wherein the classification table used in the PVClassifier operator in relation (6) is provided by Table 220 in FIG. 4. Note that the replicate boundary value s[−1]=s[0] is used to calculate PVmap[0] in this example. In Table 220, the letters P, V, and X designate classes PEAK, VALLEY, and NEITHER, respectively.

Table 220 in FIG. 4 contains the classified output according to relation (6) based on all possible combinations of signs s[x−1] and s[x]. Suppose we want to determine PVmap[x]= PVClassifier (s[x−1], s[x]), where s[x−1]=PLUS and s[x]= ZERO. Looking at the bottom row of Table 220 (which corresponds to the row when s[x−1]=PLUS) and then looking at the middle column of Table 220 (which corresponds to the column when s[x]=ZERO), the intersection between bottom row and middle column provides the classified value as PEAK (or P in FIG. 4)

Figure 5:
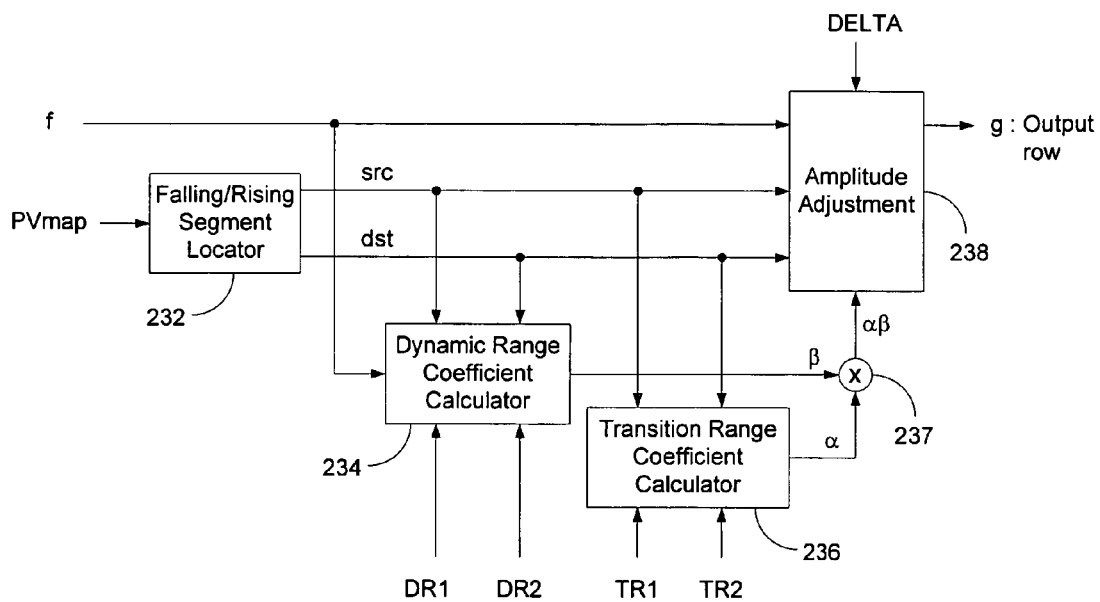
FIG. 5 shows a functional block diagram of an embodiment of the Thinning module in the system of FIG. 2.

FIG. 5 shows a functional block diagram of an implementation of the Thinning module 204 of FIG. 2, according to an embodiment of the present invention. The Thinning module 204 comprises a Falling/Rising Segment Locator 232, a Dynamic Range Coefficient Calculator 234, a Transition Range Coefficient Calculator 236, a multiplication unit 237 and an Amplitude Adjustment module 238. To better understand the operation of the Thinning module 204 an example pseudocode implemented for the Thinning module 204 is listed in Table 1, as described further below:

TABLE 1

| FUNCTION g = Thinning(f, PVmap) | |
| --- | --- |
| Step 1: | src = SearchForNextPV(PVmap, 0); |
| Step 2: | WHILE (src < N−1) |
| Step 3: | dst = SearchForNextPV(PVmap, src); |
| Step 4: | IF (AVmap[src] == AVmap[dst]) |
| Step 5: | GOTO 9; |
| : | ENDIF |
| Step 6: | beta = CalculateDRCoeff(f[src], f[dst], DR1, DR2); |
| Step 7: | alpha = CalculateTRCoeff(src, dst, TR1, TR2); |
| Step 8: | g[src:dst] = AmplitudeAdjust(f[src:dst], DELTA, alpha*beta); |
| Step 9: | src = dst; |
| : | ENDWHILE |

In the Thinning module 204, the Falling/Rising Segment Locator 232 locates the falling and rising segments (e.g., segments 102, 104 in FIG. 2) in an image row f from the PVmap input, generating the above-mentioned indices src and dst. The indices src and dst are used to specify, respectively, the starting and ending pixels of the considered falling or rising segment of the current input row f (e.g., see falling segment 102 in FIG. 1).

In the following, the example Steps 1 through 9 shown in the pseudocode of Table 1 are described in relation to FIG. 5, wherein:

Step 1: First, the index src is set to the first PEAK or VALLEY that occurred in the current row f by using function SearchForNextPv (SearchForNextpv is explained further below).

Step 2: While the index src is less than the last index of row N−1, the following Steps 3 to 9 are performed.

Step 3: The index dst is searched based on the current starting index src and PVmap using the function Search-ForNextPV.

Step 4: In the case where the classes of pixels at indices src and dst are the same, then Step 5: go to Step 9; otherwise, proceed to Step 6.

Up to this point, the two indices src and dst obtained according to Steps 1 through 5, are implemented in the Falling/Rising Segment Locator 232.

Step 6: For each located segment (specified by src and dst), an associated dynamic range coefficient $\beta \in [0,1]$ is calculated using the Dynamic Range Coefficient Calculator 234 according to function CalculateDRCoeff in the pseudocode using relation (7) below:

$$\beta = \max\left(0, \min\left(1, \frac{dr - DR1}{DR2 - DR1}\right)\right), \tag{7}$$

wherein dr=|f[src]−f[dst]|, and the parameters DR1 and DR2 are the dynamic range thresholds. The value f[x] represents the grayscale value of the pixel in the current input row f at the index x. Typical values of DR1 and DR2 are, respectively, e.g. 50 and 255 for 8-bit grayscale input image.

Step 7: A transition range coefficient $\alpha \in [0,1]$ is calculated by the Transition Range Coefficient Calculator 236 according to function CalculateTRCoeff in the pseudocode using relation (8) below:

$$\alpha = \max\left(0, \min\left(1, \frac{tr - TR2}{TR1 - TR2}\right)\right), \quad (8)$$

wherein tr=dst−src+1, and the parameters TR1 and TR2 are the transition range thresholds. Examples of values TR1 and TR2 are, respectively, 4 and 12.

Step 8: Once both α and β are obtained, the Amplitude Adjustment module 238 (function AmplitudeAdjust in the pseudocode) is used to adjust the grayscale value of each pixel within the considered segment. To do the adjustment, the normalized pixel values f′∈[0,1] are first calculated according to relation (9) below:

$$f'[x] = \frac{f[x] - \min(f[src], f[dst])}{|f[src] - f[dst]|}, \quad \text{for } src \le x \le dst. \quad (9)$$

Then, the amount of adjustment δ is calculated according to relation (10) below:

$$\delta[x] = \begin{cases} 2 \cdot DELTA \cdot f'[x] & \text{if } f'[x] < 0.5; \\ 2 \cdot DELTA \cdot (1 - f'[x]) & \text{otherwise,} \end{cases} \quad \text{for } src \le x \le dst, \quad (10)$$

wherein the parameter DELTA is the user input indicating the level of thinning. The typical value for DELTA ranges, e.g. from 0 to 0.5. After the amount of adjustment δ is calculated, it is used to update the normalized pixel value f′ according to relation (11) below:

$$f'[x] \leftarrow f'[x] + \alpha \cdot \beta \cdot \delta[x], \text{ for src} < x < dst. \quad (11)$$

Note that the operator ← means that the left hand side operand of this operator can be replaced by the right hand side operand directly. It is straightforward to verify that δ[src]=δ[dst]=0. Therefore, in relation (11) above, the grayscale values at both ends (src and dst) of a considered segment do not need to be updated. The final step of the adjustment is to perform inverse normalization. That is, the resulting updated grayscale value g (output row) of considered segment after the application of LTA to the input row f is determined according to relation (12) below:

$$g[x] = f'[x] \cdot |f[src] - f[dst]| + \min(f[src], f[dst]), \text{ for src} \le x \le dst. \quad (12)$$

Step 9: The index src is reassigned by the current index dst. Then, the process is repeated (i.e., Steps 2 to 9) until all segments in the considered row are adjusted or equivalently the index src is greater than N−1.

In Table 2 below, pseudocode description of the aforementioned function SearchForNextPV is provided.

TABLE 2

| FUNCTION dst = SearchForNextPV(PVmap, src) | |
|---|---|
| Step 1: | dst = src; |
| Step 2: | DO |
| Step 3: | dst = dst + 1; |
| Step 4: | IF (dst > N−1) |
| Step 5: | dst = N−1; |
| Step 6: | GOTO 8; |
| | ENDIF |
| Step 7: | WHILE (PVmap[dst] == NEITHER) |
| Step 8: | RETURN dst; |

The function SearchForNextPV is used for searching the next index dst equal to either PEAK or VALLEY given the starting index src on the PVmap, as described below in relation to Steps 1 through 8 in Table 2 above:

Step 1: The index dst is set to equal src.
Step 2: The following Steps 3 to 7 are repeated until condition in Step 7 is reached.
Step 3: The index dst is increment by one.
Step 4: In the case where the index dst is greater than the last index of current row N−1, then Steps 5 and 6 are performed; otherwise, check the condition in Step 7.
Step 5: The index dst is set to N−1.
Step 6: Go to Step 8.
Step 7: The class of pixel at dst is checked to determine if it is equal to NEITHER. If so, repeat Steps 3 to 7; otherwise, go to Step 8.
Step 8: The index dst is the output of the function.

As such, the present invention provides an LTA method and system for the grayscale input image, wherein the LTA is a separable algorithm that performs on each row of input grayscale image sequentially from top to bottom and subsequently on each column from left to right, independently. The LTA is very robust to the noise and is capable of thinning lines even in noisy image areas. The level of thinning is fully adaptive to the transition range and dynamic range locally in each line segment. Furthermore, the LTA for a black line can be easily generalized for a white line counterpart by simply switching the sign of one parameter DELTA from positive to negative without changing other aspects of the LTA.

An LTA according to the present invention is suitable, for example, in digital TV applications where screen resolution (i.e., number of pixels in horizontal and vertical directions) is higher than the original image resolution. After the original image is scaled up to fit the screen resolution, the contents including lines within image become wider. Therefore, the application of Black LTA thins the scaled black lines. As a result, the overall image is sharpened. Note that the Black LTA is used in the luminance channel only while leaving the chrominance channels intact. As those skilled in the art will recognize, such an LTA for black lines can be easily generalized to LTA for white line counterparts by switching the sign of parameter DELTA from positive to negative.

The present invention has been described in considerable detail with reference to certain preferred versions thereof; however, other versions are possible. Therefore, the spirit and scope of the appended claims should not be limited to the description of the preferred versions contained herein.

What is claimed is:

1. A line thinning method for a grayscale digital image of pixels, including the steps of:
    employing a processor for:
    (a) for a pixel in a sequence of pixels in the input image stored in a memory, locating a segment of the sequence including the pixel and neighboring pixels;
    (b) determining the local characteristics of the segment based on the characteristics of the pixels therein, said determining including determining an estimated derivative d and determining each refined derivative d′ from each derivative d for each pixel in a set f of N pixels {f[0], f[1], ..., f[N−1]}, as:

$$d'[x] = \begin{cases} d[x] & \text{if } |d[x]| > THR; \\ 0 & \text{otherwise} \end{cases} \quad \text{for } 0 \le x \le N - 1$$

wherein THR represents a threshold value; and
(c) performing a thinning operation on the pixel based on the local characteristics of the segment by adjusting a grayscale value of the pixel.

2. The method of claim 1 wherein said local characteristics include dynamic range of the segment based on the characteristics of the pixels in the segment.

3. The method of claim 1 wherein said local characteristics include transition range of the segment based on the characteristics of the pixels in the segment.

4. The method of claim 1 wherein said local characteristics include dynamic range and transition range of the segment, based on the characteristics of the pixels in the segment.

5. The method of claim 4 wherein the step of determining said local characteristics includes the steps of determining the local characteristics of the segment based on the luminance values of the pixels in the segment.

6. The method of claim 5, wherein the sequence of pixels represents a line in grayscale.

7. The method of claim 6, wherein said local characteristics are a measure of the visibility of the line in the image compared to image background.

8. The method of claim 6, wherein said local characteristics include a dynamic range and transition range of the segment, providing a measure of the visibility of portion of the line in the image segment compared to image background.

9. The method of claim 8, wherein the dynamic range indicates how obvious the line is in the image.

10. The method of claim 8, wherein the transition range indicates how wide the line is.

11. The method of claim 1, wherein:
the step of determining said local characteristics includes the steps of determining the dynamic range and the transition range of the segment, based on the characteristics of the pixels in the segment; and
the step of performing thinning further includes the steps of performing a thinning operation on the pixel based on the dynamic range and transition range of the segment.

12. The method of claim 11 wherein the step of determining the dynamic range further includes the steps of determining the difference between pixel grayscale level at ends of the segment.

13. The method of claim 11 wherein the step of determining the transition range further includes the steps of determining the number of pixels in the segment.

14. The method of claim 13 wherein the sequence of pixels comprises a row of pixels in the image.

15. The method of claim 14 wherein the sequence of pixels comprises a column of pixels in the image.

16. The method of claim 1 further comprising the steps of performing steps (a) through (c) for all the pixels in the image.

17. The method of claim 1 further comprising the steps of:
performing steps (a) through (c) for each row of pixels in the image, and independently performing steps (a) through (c) for each column of pixels in the image.

18. The method of claim 1 wherein the step of locating a segment further includes the steps of:
locate each falling segment in the sequence that is characterized by pixels having a decreasing dynamic range, and locating each rising segment in the sequence that is characterized by pixels having an increasing dynamic range, one end of each segment being at a dynamic range maximum (PEAK) pixel in the sequence and the other end of the segment being at a dynamic range minimum (VALLEY) pixel in the sequence.

19. The method of claim 18, wherein the steps of performing thinning further includes the steps of:

determining a dynamic range coefficient β for each segment;
determining a transition range coefficient α for each segment; and
adjusting each input pixel in a segment to generate an output pixel based on the dynamic range coefficient β and the transition range coefficient α of the segment.

20. An image processing system for thinning of a grayscale digital image of pixels, including:
a processor coupled to a memory, the memory configured to store the grayscale digital image of pixels;
the processor including:
a detector module that determines the local characteristics of a sequence of pixels based on the characteristics of the pixels in the sequence;
a differentiating module that for each pixel in the sequence determines an estimated derivative d for each pixel in a set f of N pixels {f[0], f[1], . . . , f[N−1]}, as:

$d[x]=f[x+1]-f[x]$, for $0 \leq x \leq N-1$; and a thinning module that performs a thinning operation on a pixel in the sequence based on the local characteristics of the sequence, to generate output pixels, wherein a grayscale value of the pixel is adjusted.

21. The system of claim 20, wherein the detector module generates a PVmap indicating said characteristics of the sequence, the PVmap including a class associated with each pixel in the sequence, wherein the class for each pixel includes one of attributes {PEAK, VALLEY, NEITHER}.

22. The system of claim 21, wherein the detector module comprises:
a threshold module that determines a refined derivative d' from each derivative d;
a sign module that determines a sign s from each refined derivative d';
a classifier module that generates the PVmap including a class associated with each pixel in the sequence, based on the determined sign s for the corresponding pixel.

23. The system of claim 22 wherein the threshold module determines each refined derivative d' from each derivative d for each pixel in a set f of N pixels {f[0], f[1], . . . , f[N−1]}, as:

$$d'[x] = \begin{cases} d[x] & \text{if } |d[x]| > THR; \\ 0 & \text{otherwise} \end{cases} \text{ for } 0 \leq x \leq N-1$$

wherein THR represents a threshold value.

24. The system of claim 22 wherein the sign module determines the sign s from each refined derivative d' for each pixel in a set f of N uipixels {f[0], f[1], . . . , f[N−1]}, as:

$$s[x] = \begin{cases} \text{MINUS} & \text{if } s[x] < 0; \\ \text{ZERO} & \text{if } s[x] = 0; \\ \text{PLUS} & \text{otherwise.} \end{cases} \text{ for } 0 \leq x \leq N-1$$

25. The system of claim 22 wherein the classifier module generates the PVmap for each pixel in a set f of N pixels {f[0], f[1], . . . , f[N−1]} as:

$PVmap[x]=PVClassifier(s[x-1],s[x])$, for $0 \leq x \leq N-1$, wherein PVClassifier comprises a selected classification table.

26. The system of claim 21 wherein the thinning module further performs a thinning operation on each pixel in the sequence based on the PVmap to generate output pixels.

27. The system of claim 26 wherein the thinning module comprises:
a segment locator that uses the PVmap to locate each falling segment in the sequence that is characterized by pixels having a decreasing dynamic range, and to locate each rising segment in the sequence that is characterized by pixels having an increasing dynamic range, wherein each segment has an end at a pixel src and another end at a pixel dst, one end of each segment being at a dynamic range maximum (PEAK) pixel in the sequence and the other end of the segment being at a dynamic range minimum (VALLEY) pixel in the sequence.

28. The system of claim 27 wherein the thinning further module comprises a dynamic range coefficient calculator that determines a dynamic range coefficient β for each segment.

29. The system of claim 28 wherein the dynamic range coefficient calculator determines the dynamic range coefficient β for a segment as:

$$\beta = \max\left(0, \min\left(1, \frac{dr - DR1}{DR2 - DR1}\right)\right), \text{ wherein}$$

dr=|f[src]−f[dst]| represents dynamic range of the segment, the value f[x] represents the grayscale value of the pixel in the current input row f at the index x, and DR1 and DR2 are dynamic range thresholds.

30. The system of claim 28 wherein the thinning module further includes a transition range coefficient calculator that determines a transition range coefficient α for each segment.

31. The system of claim 30 wherein the transition range coefficient calculator determines the transition range coefficient α for a segment as:

$$\alpha = \max\left(0, \min\left(1, \frac{tr - TR2}{TR1 - TR2}\right)\right),$$

wherein tr=dst−src+1, and

TR1 and TR2 are transition range thresholds.

32. The system of claim 30 wherein the thinning module further includes an amplitude adjuster that adjusts each input pixel in a segment having ends src and dst to generate an output pixel based on the dynamic range coefficient β and the transition range coefficient α of the segment.

33. The system of claim 32 wherein the amplitude adjuster determines an amplitude adjusted output pixel g[x] from an input pixel f[x] by:

calculating normalized pixel values f'∈[0,1] as:

$$f'[x] = \frac{f[x] - \min(f[src], f[dst])}{|f[src] - f[dst]|}, \text{ for } src \leq x \leq dst;$$

calculating the amount of adjustment δ as:

$$\delta[x] = \begin{cases} 2 \cdot DELTA \cdot f'[x] & \text{if } f'[x] < 0.5; \\ 2 \cdot DELTA \cdot (1 - f'[x]) & \text{otherwise,} \end{cases} \text{ for } src \leq x \leq dst,$$

wherein the parameter DELTA is user input indicating the level of thinning;

updating the normalized pixel value f' with the amount of adjustment δ as:

f'[x]←f'[x]+α.β.δ[x], for src<x<dst; and calculating output pixel g[x] as:

g[x]=f'[x].|f[src]−f[dst]|+min(f[src],f[dst]), for src≦x≦dst.

34. The method of claim 1, wherein grayscale values of pixels in a falling segment and a rising segment are raised.

35. An image processing system for thinning of a grayscale digital image of pixels, including:
a processor coupled to a memory, the memory configured to store the grayscale digital image of pixels;
the processor including:
a detector module that determines the local characteristics of a sequence of pixels based on the characteristics of the pixels in the sequence, the detector module comprising:
a differentiating module that for each pixel in the sequence determines an estimated derivative d for each pixel in a set f of N pixels {f[0], f[1], . . . , f[N−1]}, as:

d[x]=f[x+1]−f[x], for 0≦x≦N−1;

a threshold module that determines a refined derivative d' from each derivative d;
a sign module that determines a sign s from each refined derivative d'; and
a classifier module that generates the PVmap including a class associated with each pixel in the sequence, based on the determined sign s for the corresponding pixel; and
a thinning module that performs a thinning operation on a pixel in the sequence based on the local characteristics of the sequence, to generate output pixels,
wherein a grayscale value of the pixel is adjusted.

* * * * *